Dec. 5, 1950     E. W. WINANS     2,532,829
TORQUE TRANSMITTING SHAFT COUPLING
Filed May 14, 1946
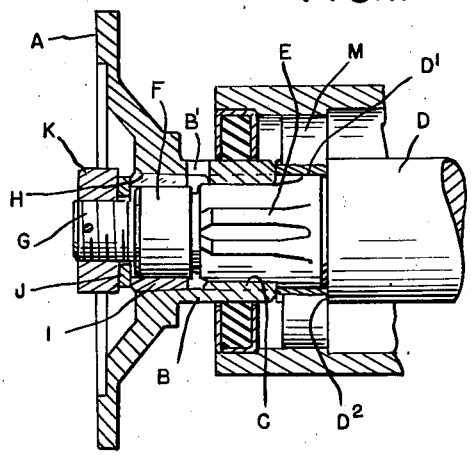
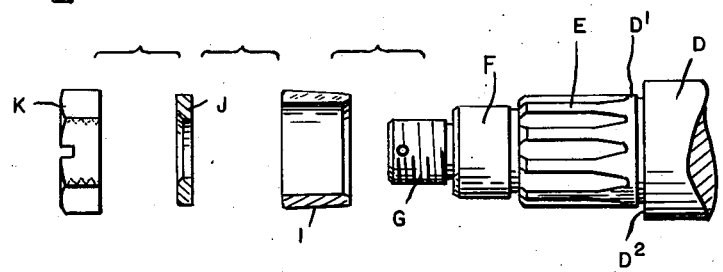
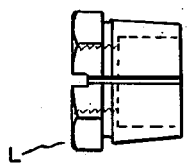
INVENTOR.
EARL W. WINANS
BY
ATTORNEYS Patented Dec. 5, 1950

2,532,829

UNITED STATES PATENT OFFICE 2,532,829

TORQUE TRANSMITTING SHAFT COUPLING

Earl W. Winans, Detroit, Mich.

Application May 14, 1946, Serial No. 669,571

3 Claims. (Cl. 287—52.06)

The invention relates to shaft couplings and it is more particularly designed for use in motor trucks for connection of the propeller shaft with the shaft of the driving axle or of the transmission.

It is the object of the invention to obtain a construction which may if desired be used as a replacement for constructions now in use and with but a small alteration in the construction or dimensions of associated parts and with no alteration in the exterior dimensions. To this end the invention consists in the construction as hereinafter set forth.

In the drawings:

Fig. 1 is a longitudinal section partly in elevation illustrating my improved torque transmitting shaft coupling;

Fig. 2 illustrates a number of the cooperating elements of the structure detached from each other;

Fig. 3 is an elevation of a slightly modified construction.

In the present state of the art it is usual to couple the propeller shaft to the shaft of the driving axle and/or the transmission through the medium of a circular flange member having an internally splined hub. This hub engages external splines on the shaft to be coupled and, therefore, will transmit torque from the one to the other. With a spline construction due to, first, certain necessary clearances and, second, to unavoidable machining variations, the flange is never in perfect coaxial relation to the shaft. It has been found, in addition, that after a certain amount of use there will be wear so as to cause lost motion between the splines of the hub and shaft and such lost motion will cause still further wear. Also, this wear will permit the shaft and hub to get out further from coaxial relation. To overcome this defect I have devised a construction which without changing external dimensions will hold the hub and shaft at all times in coaxial relation and which will also prevent lost motion between the splines of the hub and shaft. After extended use should the flange become loose, it may easily be tightened.

In detail, A is the coupling flange member of a propeller shaft (not shown) and B is the hub portion integral with said flange provided with internal splines C. D is the shaft member to be coupled to the propeller shaft which has an externally splined portion E. Adjacent to the outer end of the portion E is a plain cylindrical portion F of slightly smaller diameter and beyond the latter is a threaded portion G of still smaller diameter. The general dimensions of these elements are the same as in constructions as heretofore used with the exception that in the latter the portion F is omitted and the splines E are extended equal to the length of such portion. Consequently, my improved construction may be formed from the older one by turning down a portion of the length of the splines to form the cylindrical portion F. The hub B is also modified by removing a portion of the length of the splines thereof to form a slightly tapering socket H. Between the portions F and H there is inserted an externally tapered split bushing I which normally extends outward slightly beyond the adjacent portion of the flange A. A washer J sleeved on the portion G bears against the bushing I and a nut K threaded on the portion G serves as a clamping means. Thus, by tightening the nut K the split bushing I will be forced into the socket H so as to tightly clamp the hub B upon the shaft in exact coaxial relation therewith. While the cutting away of a portion of the length of the splines reduces the load carrying capacity thereof, this is more than compensated for by the frictional coupling which is capable of transmitting a considerable portion of the torque. However, the important advantage of the construction is that lost motion between the splines is prevented by the frictional resistance to independent rotation of the shaft D and hub B. Consequently, wear or deformation by impact is prevented and the life of the entire structure is increased.

In Fig. 3 a slightly modified construction is illustrated comprising a member L which is a combination of the nut K and bushing I integral with each other. The construction is otherwise the same as previously described.

The shaft D is journaled in an antifriction bearing M which is sleeved on a portion D' and has an end-thrust bearing against a shoulder $D^2$ of said shaft. The hub B engages the opposite end of the bearing M and as said hub and also the bushing I are both longitudinally adjustable on the shaft, the nut K serves to clamp the bearing in position as well as clamping the bushing to the shaft.

To facilitate removal of the bushing I, the hub B has an aperture B' therein through which a suitable tool may be inserted to bear against the inner end of the bushing.

What I claim as my invention is:

1. A torque transmitting coupling comprising a flanged hub member having internal splines extending a portion of the length thereof and a tapered socket in another portion of the length, a shaft having a large diameter externally splined portion for engaging the splines of the hub member, a cylindrical portion of slightly smaller diameter within the tapered socket and a threaded end portion, a split tapered bushing inserted between said cylindrical portion and tapered socket, and a nut engaging said threaded portion for forcing said split bushing into frictional coupling engagement with said hub member and shaft.

2. A torque transmitting coupling comprising a flanged hub member having internal splines extending a portion of the length thereof and a tapered socket in another portion of the length, a shaft having a large diameter externally splined portion for engaging the splines of the hub member, a cylindrical portion of slightly smaller diameter within the tapered socket and a threaded end portion, an externally tapered split bushing for insertion between said cylindrical portion and tapered socket portion and extending outward therefrom to slightly overlap said threaded portion, a washer on said threaded portion bearing against the outer end of said split bushing, and a nut on said threaded portion for clamping said tapered bushing in frictional coupling engagement with said hub member and a shaft to hold the same in exact coaxial relation and to prevent lost motion between the splines of said hub member and shaft.

3. A torque transmitting coupling comprising a flanged hub member having internal splines extending a portion of the length thereof and a tapered socket in another portion of the length, a shaft having an end thrust bearing thereon, a large diameter externally splined portion on said shaft and adjacent to said bearing for engaging the splines of said hub member, said shaft having a cylindrical portion of slightly smaller diameter within the tapered socket and a threaded end portion, a split tapered bushing inserted between said cylindrical portion and tapered socket, and a nut engaging said threaded portion for forcing said split bushing into frictional coupling engagement with said hub member and also forcing the latter against said end thrust bearing.

EARL W. WINANS.

REFERENCES CITED

The following references are of record in the file of this patent:

UNITED STATES PATENTS

| Number | Name | Date |
|---|---|---|
| 389,430 | Massett | Sept. 11, 1888 |
| 1,395,913 | Ford | Nov. 1, 1921 |
| 2,345,910 | Fawcett | Apr. 4, 1944 |

FOREIGN PATENTS

| Number | Country | Date |
|---|---|---|
| 15,874 | Great Britain | July 2, 1914 |